(12) United States Patent
Lickfelt et al.

(10) Patent No.: US 9,976,322 B2
(45) Date of Patent: May 22, 2018

(54) VEHICLE LOCK-OUT PROTECTION SYSTEM

(71) Applicant: Honda Motor Co., Ltd., Tokyo (JP)

(72) Inventors: Brian Karl Lickfelt, Powell, OH (US); Bharath Kumar Parasurama, Bengaluru (IN)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 15/275,127

(22) Filed: Sep. 23, 2016

(65) Prior Publication Data

US 2018/0087295 A1    Mar. 29, 2018

(51) Int. Cl.
| | |
|---|---|
| *E05B 81/56* | (2014.01) |
| *B60C 5/00* | (2006.01) |
| *B60R 16/023* | (2006.01) |
| B60R 25/24 | (2013.01) |
| G05B 19/00 | (2006.01) |
| G05B 23/00 | (2006.01) |
| G07C 9/00 | (2006.01) |
| E05B 49/00 | (2006.01) |
| B60R 25/04 | (2013.01) |
| B60R 25/20 | (2013.01) |
| G06K 19/07 | (2006.01) |
| B60R 25/00 | (2013.01) |

(52) U.S. Cl.
CPC .............. *E05B 81/56* (2013.01); *B60C 5/005* (2013.01); *B60R 16/023* (2013.01); *B60R 25/00* (2013.01); *B60R 25/04* (2013.01); *B60R 25/2009* (2013.01); *B60R 25/2036* (2013.01); *B60R 25/24* (2013.01); *B60R 25/245* (2013.01); *E05B 49/00* (2013.01); *G05B 19/00* (2013.01); *G05B 23/00* (2013.01); *G06K 19/07* (2013.01); *G07C 9/00* (2013.01)

(58) Field of Classification Search
CPC .......... E05B 81/56; E05B 49/00; E05B 65/20; B60R 25/04; B60R 25/2009; B60R 25/24; B60R 25/2036; B60R 25/00; B60R 6/023; B60R 25/083; B60R 25/045; B60R 25/209; B60R 25/245; B60Q 5/005; G07C 9/00309; G06K 19/07; H04B 1/1615; H04B 7/00; H04W 52/0225; G08C 17/00; G08C 17/02; G08C 19/00
See application file for complete search history.

(56) References Cited

U.S. PATENT DOCUMENTS 6,906,612 B2   6/2005  Ghabra et al.
7,242,282 B2   7/2007  Pinckney, Sr.
(Continued)

*Primary Examiner* — Behrang Badii
(74) *Attorney, Agent, or Firm* — Kenealy Vaidya LLP

(57) ABSTRACT

A lock-out protection system of a vehicle is configured for use with a portable transceiver, the vehicle having an interior and doors configured to open and close to facilitate ingress to and egress from the interior and being lockable and unlockable upon issuance of corresponding commands, and the transceiver configured to send and receive signals. The system can include a processor configured to, upon receipt of a door lock command when a door is in open position and then moved to closed position: determine presence or absence of the transceiver inside the vehicle interior and outside the vehicle interior; and issue a door unlock command if the processor determines that the transceiver is absent both inside the vehicle interior and outside the vehicle interior.

20 Claims, 2 Drawing Sheets

(56) References Cited

U.S. PATENT DOCUMENTS

| | | | |
|---|---|---|---|
| 7,683,764 B2 | 3/2010 | Kurpinski et al. | |
| 8,571,725 B2 | 10/2013 | Juzswik | |
| 8,620,490 B2 | 12/2013 | Lickfelt et al. | |
| 2005/0164728 A1* | 7/2005 | Matsubara | B60R 25/2009 455/521 |
| 2007/0216517 A1* | 9/2007 | Kurpinski | B60R 25/2036 340/5.72 |
| 2009/0256674 A1* | 10/2009 | Lee | B60R 25/24 340/5.6 |
| 2015/0061856 A1 | 3/2015 | Raman et al. | |
| 2016/0176381 A1* | 6/2016 | Krawciw | B60R 25/04 340/5.72 |

* cited by examiner

VEHICLE LOCK-OUT PROTECTION SYSTEM

BACKGROUND

Vehicle access systems, particularly remote access systems that include a key fob for performing various vehicle operations, promote convenient ingress and egress for operators and passengers by simplifying locking and unlocking procedures. Use of conventional remote access systems may sometimes result in the fob being locked inside the vehicle, such as by locking the doors via the fob or door switch while the door is open and then closing the door with the fob inside the vehicle. Locking the fob inside the vehicle can impede an operator outside the vehicle from entering and operating the vehicle.

A need was identified for an effective lock-out protection system capable of safeguarding against a key fob being locked inside a vehicle due to signal interference, dead battery, communication error, and signal blindspot.

SUMMARY

According to one aspect, a lock-out protection system of a vehicle is configured for use with a portable transceiver, the vehicle having an interior and doors configured to facilitate ingress to and egress from the interior and being lockable and unlockable upon issuance of corresponding commands, and the transceiver configured to send and receive signals. The system can include a processor configured to, upon receipt of a door lock command when a door is in open position and then moved to closed position: determine presence or absence of the transceiver inside the vehicle interior and outside the vehicle interior; and issue a door unlock command if the processor determines that the transceiver is absent both inside the vehicle interior and outside the vehicle interior.

According to another aspect, a remote access system of a vehicle is provided having an interior and doors configured to open and close to facilitate ingress to and egress from the interior and being lockable and unlockable upon issuance of corresponding commands. The system includes a portable transceiver that is configured to send and receive signals. The system additionally includes a processor configured to, upon receipt of a door lock command when a door is in open position and then moved to closed position: determine presence or absence of the transceiver inside the vehicle interior and outside the vehicle interior; and issue a door unlock command if the processor determines that the transceiver is absent both inside the vehicle interior and outside the vehicle interior.

According to yet another aspect, a method is provided for facilitating remote access to a vehicle having an interior and doors configured to open and close to facilitate ingress to and egress from the interior and being lockable and unlockable upon issuance of corresponding commands, the vehicle including a display device configured to display at least one operational condition of the vehicle and an audio device configured to emit at least one audible signal and being configured for use with a portable transceiver that is configured to send and receive signals. The method includes: determining whether a door lock command has been received when a door is in open position and then moved to closed position; determining presence or absence of the transceiver inside the vehicle interior and outside the vehicle interior; and issuing a door unlock command if the transceiver is absent both inside the vehicle interior and outside the vehicle interior.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall System and Vehicle

Figure 1:
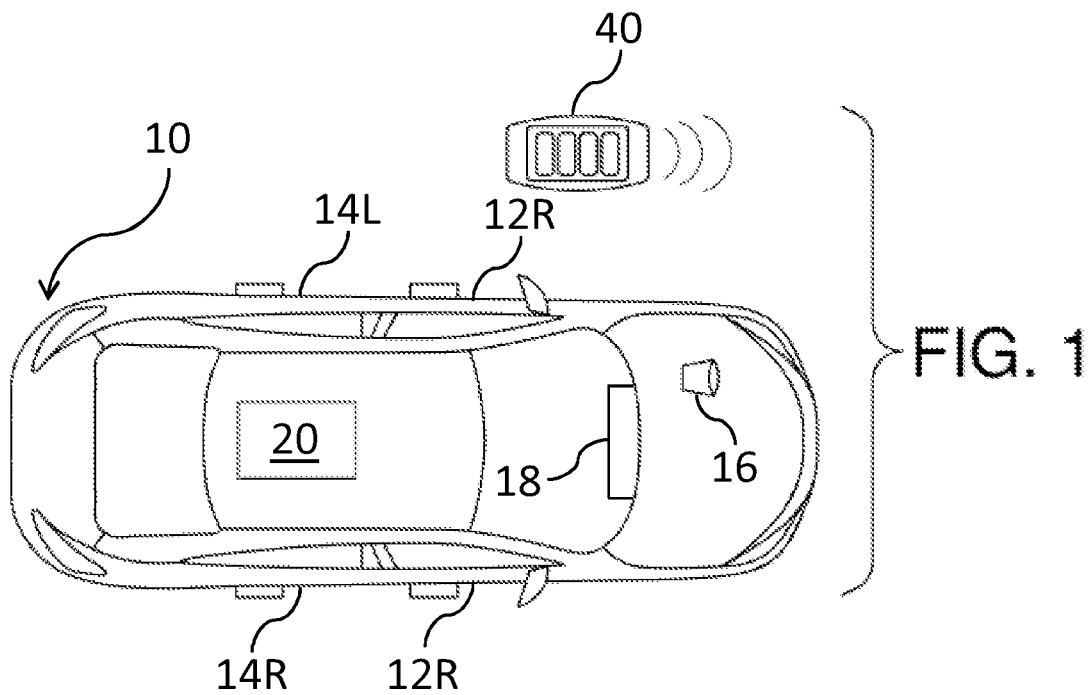
FIG. 1 is a top view of an exemplary vehicle lock-out protection system for use with a transceiver in accordance with the disclosed subject matter.
Figure 2:
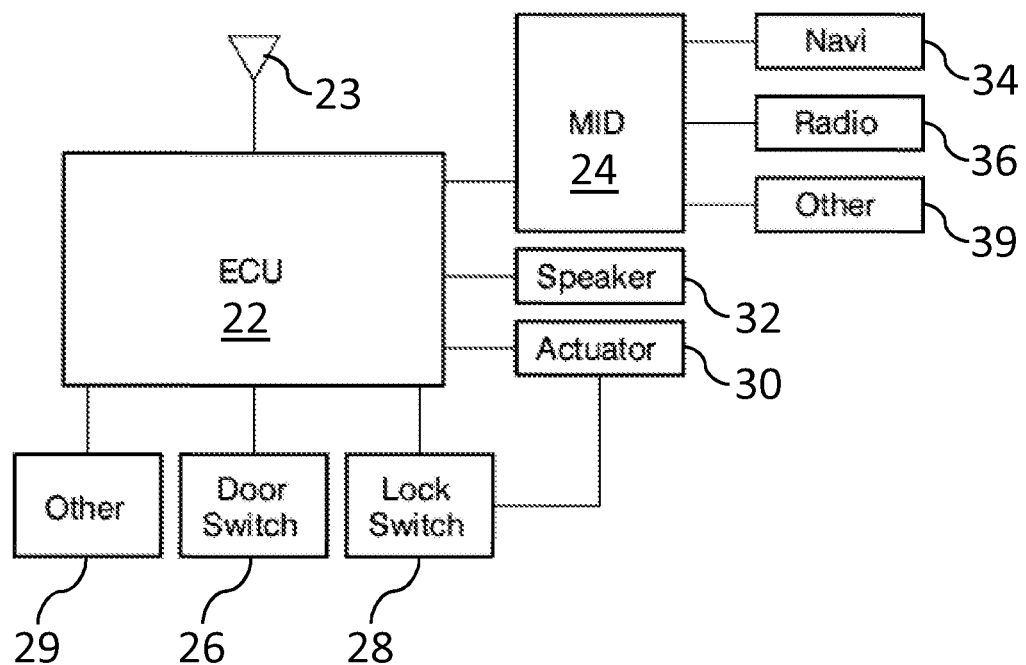
FIG. 2 is a schematic representation of the exemplary vehicle lock-out protection system in accordance with the disclosed subject matter.

FIG. 1 is a top view of an exemplary vehicle lock-out protection system 20 for use with a transceiver 40 in accordance with the disclosed subject matter. The exemplary system 20 is configured for use with a vehicle 10, the transceiver 40 being configured to transmit and receive signals to and from the system 20 to perform various vehicle operations.

The transceiver 40 in the present embodiment may be configured as a vehicle key fob, and may perform operations such as locking and unlocking the vehicle, as well releasing and/or closing a trunk, raising and/or lowering windows, opening and/or closing a sunroof, starting/stopping an engine/motor, and other vehicle operations capable of being initiated remotely. In some embodiments, the transceiver 40 may alternatively be configured as a smartphone, portable computer such as a laptop, tablet, etc. As described below and illustrated in FIG. 4, the transceiver 40 can be configured to communicate relative position to the system 20 such that the system 20 can determine presence or absence of the transceiver 40 within communication zones, such as inside or outside of the vehicle.

The vehicle 10 can be configured as a passenger vehicle, a racecar, a commercial vehicle (i.e., a truck), or any other type of vehicle. An interior of the vehicle 10 defines a passenger area (i.e., a cabin) for vehicle operators and/or passengers, particularly during operation of the vehicle 10. The vehicle 10 shown in FIG. 1 is primarily for use on paved roadways, and can be referred to as a passenger vehicle. The vehicle 10 may also be configured for use on unpaved roadways consisting of gravel, dirt, sand, etc.

The vehicle 10 includes front doors 12L,R and rear doors 14L,R through which operators and/or passengers may enter and exit the cabin. Subsequent description and reference to the doors of the vehicle 10 below is intended to include any and all of the front doors 12L,R and rear doors 14L,R mentioned above and designated in FIG. 1, as well as any alternate and/or additional doors present in other vehicle embodiments. The doors can be manually operable, power-assisted or automatic. The doors can support respective windows, each of which being slidable with respect to frames of the doors between opened and closed positions via a window actuator. Each of the doors can also include an exterior door handle that may be actuated to facilitate opening of the door. As described below, the door handles may include locking/unlocking mechanisms operated via buttons, switches, sensors, etc. located thereon. The locking/unlocking mechanisms of the doors may also be operated via buttons, switches, sensors, etc. located on an interior-side of the each door.

The vehicle 10 is further configured to include an audio device 32 in communication with the lock-out protection system 20. The audio device 32 may include one or more speakers or alternative sound emitting components configured such that the system 20 can cause the audio device 32 to emit audio signals upon occurrences of various vehicle operations. In some embodiments, the audio device 32 may also be configured as a horn.

The vehicle 10 can also be configured to include a display device 24 in communication with the lock-out protection system 20. The display device 24 may include one or more displays and/or display components configured such that the system 20 can cause the display device 24 to display messages upon occurrences of various vehicle operations. In some embodiments, the display device 24 may be configured as a multi-information display capable of displaying information corresponding to navigation, radio, video, climate control, mobile phone applications and any other displays, including operator notifications, of vehicle operations and status.

II. System & Transceiver

In the present embodiment, the lock-out protection system 20 can include a processor (ECU) 22 configured to send and receive signals via an antenna 23 and capable of executing various vehicle operations. The processor 22 of the system 20 is specifically configured to communicate with the transceiver 40 via signals sent to and from the respective antennae 23 and 43.

The processor 22 can be configured to be in communication with a door switch 26 and a lock switch 28 of at least one of the doors of the vehicle 10. The door switch 26 communicates with the processor 22 to determine whether a door is in an opened or closed position, where opened position may include partially opened positions. The lock switch 28 communicates with the processor 22 to lock or unlock a door pending a lock or unlock command. Lock and unlock commands may be initiated at the lock switch 28 by an operator or passenger of the vehicle 10, or may alternatively be initiated remotely via the transceiver 40 by an operator thereof. Additionally, lock and unlock commands may be automatically initiated by predetermined criteria of the vehicle 10 and/or the transceiver 40 being met. For example, automatic lock and unlock commands may be initiated after a predetermined duration of time following engine/motor shutoff. Automatic lock and unlock commands can also be initiated as a result of proximity and position of the transceiver 40 relative to the vehicle 10.

An actuator 30 may be configured to be in communication with the lock switch 28 such that signaling from the lock switch 28 causes the actuator 30 to either lock or unlock the door. In the present embodiment, the actuator 30 may also be configured to be in communication with the processor 22 such that signaling from the processor 22 causes the actuator 30 to either lock or unlock the door. Furthermore, at least one of the lock switch 28 and the actuator 30 may be configured to communicate whether the door is locked or unlocked to the processor 22.

In some embodiments, the processor 22 can additionally be configured to be in communication with other devices 29 that perform locking and unlocking functions for the doors. These other devices 29 can include keypads (i.e., alphanumeric keypads) disposed on an outer-side of the door for coded locking and unlocking of the door by an operator. These other devices 29 may also include sensors (i.e., haptic sensors) disposed on the inner-side and/or the outer-side of the door for sensing operator contact with the vehicle 10, such contact capable of locking/unlocking the doors, as well as initiating other vehicle operations.

The processor 22 of the present embodiment can also be configured to be in communication with an audio device 32 capable of emitting audible signals. The audio device 32 can be configured at least one speaker, such as of an in-car stereo system, or a portable stereo system that may communicate with the processor 22. The audio device 32 may further be configured as a horn or other noise-making device integrated into the vehicle 10. In some instances, the audio device can be configured to emit at least one audible signal for a predetermined duration, and at predetermined intervals.

The processor 22 of the present embodiment can furthermore be configured to be in communication with a display device 24. The display device 24 can be configured as a multi-informational display (MID). The display device 24 may therefore be configured to display information from navigation 34, radio 36, as well as other systems 39 included in the vehicle 10. The other systems 39 can include climate control, video, mobile apps, and any other vehicle operation system. The display device 24 can also display driver warnings and messages, for example service indicators, to notify operators of vehicle conditions. The display device 24 can be configured as an LCD screen disposed proximate the dash board in some embodiments of the system 20. In some instances, the display device 24 can be configured to display at least one message for a predetermined duration, or until occurrence of an event.

Figure 3:
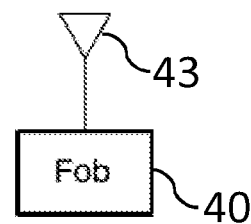
FIG. 3 is a schematic representation of the exemplary transceiver in accordance with the disclosed subject matter.

FIG. 3 is a schematic representation of the exemplary transceiver 40 in accordance with the disclosed subject matter, the transceiver 40 including the antenna 43 via which signals are sent to and received from the processor 22 of the system 20. As described above, the transceiver 40 can be configured as a remote access key fob, or alternatively as a smartphone, portable computer such as a laptop, tablet, etc. As described below and illustrated in FIG. 4, the transceiver 40 can be configured to communicate relative position to the system 20 such that the system 20 can determine presence or absence of the transceiver 40 within communication zones.

III. System Operation

Figure 4:
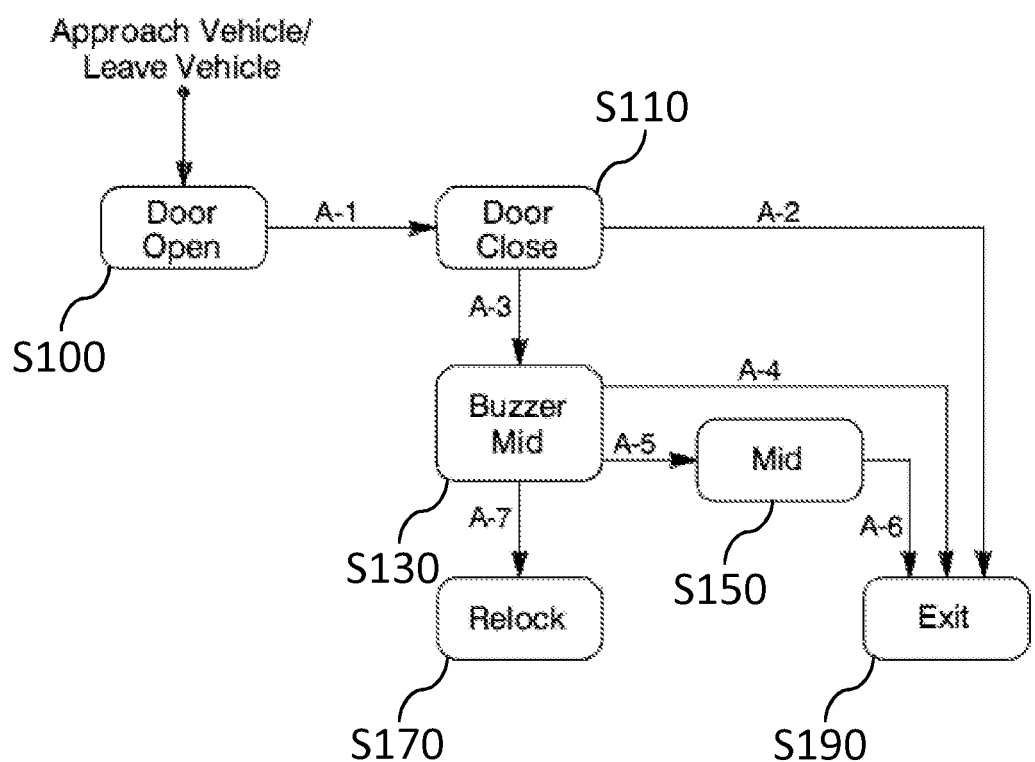
FIG. 4 is a state transition diagram for the exemplary vehicle lock-out protection system.

FIG. 4 is a state transition diagram for the exemplary vehicle lock-out protection system 20. In the present embodiment, the lock-out protection system 20 can be initiated when a person such as a vehicle operator or passenger approaches or leaves the vehicle 10.

The first state to occur is S100 in which a door of the vehicle 10 is in open position. State transition A-1 follows, in which a lock command is initiated while the door is in the open position. The lock command may be initiated by a person actuating the lock switch 28 of a door, such as a lock switch button on the inner-side or outer-side of the door, or by closing a locking knob or mechanism of a door. The lock command may also be initiated by alternate methods and structures other than those described above.

The next state to occur is S110 in which the door in open position described above is moved to closed position. When the door is moved to closed position, the door switch 26 communicates to the processor 22 that the door is in closed position. Once the lock command has been initiated for the door and the door switch registers closed position for the door, the system 20 searches for the transceiver 40 inside of the interior cabin of the vehicle 10. If the transceiver 40 is not found within the vehicle interior, the system 20 then searches for the transceiver 40 outside of the vehicle 10. These searches can be accomplished radio frequency (RF) waves transmitted to and from the processor 22 and the transceiver 40, including high and low frequencies so as to distinguish between instances in which the transceiver is inside of the vehicle 10 and those in which the transceiver is outside of the vehicle 10. Other transmissions besides RF signals may also provide this information to the system 20.

If the transceiver 40 is not found within the vehicle interior, but is detected outside of the vehicle 10, the system 20 follows state transition A-2, referred to as normal path. State transition A-2 leads to an exit state S190 at which the system proceeds to locking/auto-locking procedure because the system 20 has determined that the transceiver 40 is not at risk of being locked inside the vehicle 10.

However, if at state S110 the transceiver 40 is not found either within or outside of the vehicle 10, the system follows state transition A-3. State transition A-3 leads to state S130 in which the system 20 initiates both a predetermined audible signal via the audio device and a predetermined visual message via the display device. The predetermined audible signal may be a buzzer sound. For example, the audio device may emit a buzzer sound intermittently for 15 seconds, the buzzer sounding at 1.5 second intervals for a total of ten times before ceasing. Other durations, intervals, and frequencies of the audible signal may be emitted in this state. In addition, the predetermined visual message may be a text command displayed on an MID. For example, the text command can indicate that the transceiver 40 is absent or not detected, and that the door should be returned to opened position. Additionally, the system 20 can signal an unlock command for the door during this state S130 to provide an operator entry to the vehicle 10.

If at state S130 the processor 22 receives a remote communication to perform a vehicle operation, either automatic or manual, from the transceiver 40, the system 20 proceeds to the exit state S190 in following state transition A-4. The system 20 consequently locks or unlocks the doors according to the communication between the transceiver 40 and the processor 22.

Alternatively, if at state S130 the processor 22 determines via the door switch 26 that the door is returned to open position during the predetermined duration of the audible signal and visual display, the system 20 proceeds to state S150 in following state transition A-5. At state S150, the audible signal ceases, despite the possibility of some portion of the predetermined duration remaining. Contrarily, the visual display continues for the remainder of the predetermined duration remaining. The continued visual display of messaging on the display device 24 serves to communicate to an operator that the transceiver 40 is absent or not detected by the system 20. Additionally, returning the door to the open position can cancel any automatic locking/relocking command of the door initiated by the system 20, such as will be described below in reference to state S170. This serves to impede the transceiver 40 from being repeatedly locked inside the vehicle 10.

Accordingly, if at state S150 the predetermined duration expires or the vehicle engine/motor is turned on (i.e., the vehicle is started), the system 20 follows state transition A-6 to state S190 in which the system 20 exits the lock-out protection process. Thus, once the predetermined duration expires, the system 20 recognizes that the vehicle 10 will be operated and/or that the transceiver 40 may not be locked inside the vehicle 10 because the door is in open position.

Finally, the system 20 may follow state transition A-7 from state S130 if the door is not returned to opened position within a predetermined time period. In this instance of the predetermined duration expiring, the processor 22 initiates lock/re-lock command for the door, serving to follow standard locking operation without intervening action of an operator resulting from audible or visual notification through the system 20.

In the present embodiment, the system 20 is configured to be activated and deactivated pursuant to operator preference. For example, an operator may be able to switch the lock-out protection system 20 between ON and OFF. Additionally, an operator may further be able to customize aspects of the system 20 pertaining to the audible signal, visual display and overall functionality. The type, duration and interval of sound emitted from the audio device 32 can vary, as can the type, duration and interval of message displayed from the display device 24.

IV. Alternative Embodiments

While certain embodiments of the invention are described above, and FIGS. 1-4 disclose the best mode for practicing the various inventive aspects, it should be understood that the invention can be embodied and configured in many different ways without departing from the spirit and scope of the invention.

For example, embodiments are disclosed above in the context of a remote vehicle access system, specifically a lock-out protection system, configured for use with the transceiver and a vehicle as shown in FIG. 1. However, embodiments are intended to include or otherwise cover remote vehicle access systems configured for use with any type of transceiver and any type of vehicle.

The system of the present embodiment is intended for use with a remote access key fob for a vehicle, however other remote access devices are also considered. For example, smart phones, tablets, laptops, electronic notepads, etc. may all function as the intended transceiver to perform remote wireless operations of the vehicle.

As described above, the system can be configured for use with any combination and array of audio devices and display devices including those integrated into the vehicle, and standalone devices disposed within the vehicle. The audio and display devices may be incorporated into a single device, and may alternatively be entirely separate and distinct devices configured to communicate with a shared or individual processor(s).

The above described transceiver configured to communicate with the processor may be undetected under various circumstances including interference such as from another device or transceiver placement within a container, low/dead battery, communication error, or communication blindspot. Each of these circumstances may result in the transceiver being accidentally locked within the vehicle. Thus, the system serves to notify a vehicle operator of the possibility of this occurring, both visually and audibly. Furthermore, the system can automatically lock and relock the vehicle to provide an operator with an opportunity to locate the undetected transceiver, and gain entry to the vehicle. The exact order of operations in the system described above may vary, as well as the specific logic that occurs at each step, in keeping with the overall objective of the system to perform the above described functions.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the lock-out protection system disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A lock-out protection system of a vehicle having an interior and doors configured to open and close to facilitate ingress to and egress from the interior and being lockable and unlockable upon issuance of corresponding commands, the system configured for use with a portable transceiver that is configured to send and receive signals, the system comprising:
    a processor configured to, upon receipt of a door lock command when a door is in open position and then moved to closed position:
        determine presence or absence of the transceiver inside the vehicle interior and outside the vehicle interior; and
        issue a door unlock command if the processor determines that the transceiver is absent both inside the vehicle interior and outside the vehicle interior.

2. The lock-out protection system according to claim 1, wherein the processor is configured to cause the doors of the vehicle to unlock if the processor determines that the transceiver is present inside the vehicle interior.

3. The lock-out protection system according to claim 1, the system further comprising:
    an audio device configured to emit at least one audible signal,
    wherein the processor is configured to communicate with the audio device such that the processor causes the audio device to emit a predetermined audible signal for a predetermined duration, upon receipt of a lock command when a door is in open position and then moved to closed position, if the processor determines that the transceiver is absent both inside the vehicle interior and outside the vehicle interior.

4. The lock-out protection system according to claim 3, wherein the audio device is configured to emit the predetermined audible signal until the door is returned to the open position.

5. The lock-out protection system according to claim 3, the system further comprising:
    a display device configured to display at least one operational condition of the vehicle,
    wherein the processor is configured to communicate with the display device such that the processor causes the display device to display a predetermined message for a predetermined duration, upon receipt of a lock command when a door is in open position and then moved to closed position, if the processor determines that the transceiver is absent both inside the vehicle interior and outside the vehicle interior.

6. The lock-out protection system according to claim 5, wherein the predetermined message communicates that the transceiver is absent both inside the vehicle interior and outside the vehicle interior.

7. The lock-out protection system according to claim 5, wherein the display device is configured as a multi-informational display of the vehicle including a display screen configured to display at least one of navigation, radio, climate control, mobile applications, video and vehicle service indicators.

8. A remote access system of a vehicle having an interior and doors configured to open and close to facilitate ingress to and egress from the interior and being lockable and unlockable upon issuance of corresponding commands, the system comprising:
    a portable transceiver that is configured to send and receive signals; and
    a processor configured to, upon receipt of a door lock command when a door is in open position and then moved to closed position:
        determine presence or absence of the transceiver inside the vehicle interior and outside the vehicle interior; and
        issue a door unlock command if the processor determines that the transceiver is absent both inside the vehicle interior and outside the vehicle interior.

9. The remote access system according to claim 8, wherein the processor is configured to cause the doors of the vehicle to unlock if the processor determines that the transceiver is present inside the vehicle interior.

10. The remote access system according to claim 8, the system further comprising:
    an audio device configured to emit at least one audible signal,
    wherein the processor is configured to communicate with the audio device such that the processor causes the audio device to emit a predetermined audible signal for a predetermined duration, upon receipt of a lock command when a door is in open position and then moved to closed position, if the processor determines that the transceiver is absent both inside the vehicle interior and outside the vehicle interior.

11. The remote access system according to claim 10, wherein the audio device is configured to emit the predetermined audible signal until the door is returned to open position.

12. The remote access system according to claim 10, the system further comprising:
a display device configured to display at least one operational condition of the vehicle,
wherein the processor is configured to communicate with the display device such that the processor causes the display device to display a predetermined message for a predetermined duration, upon receipt of a lock command when a door is in open position and then moved to closed position, if the processor determines that the transceiver is absent both inside the vehicle interior and outside the vehicle interior.

13. The remote access system according to claim 12, wherein the predetermined message communicates that the transceiver is absent both inside the vehicle interior and outside the vehicle interior.

14. The remote access system according to claim 12, wherein the display device is configured as a multi-informational display of the vehicle including a display screen configured to display at least one of navigation, radio, climate control, mobile applications, video and vehicle service indicators.

15. A method for facilitating remote access to a vehicle having an interior and doors configured to open and close to facilitate ingress to and egress from the interior and being lockable and unlockable upon issuance of corresponding commands, the vehicle including a display device configured to display at least one operational condition of the vehicle and an audio device configured to emit at least one audible signal and being configured for use with a portable transceiver that is configured to send and receive signals, the method including:
determining whether a door lock command has been received when a door is in open position and then moved to closed position;
determining presence or absence of the transceiver inside the vehicle interior and outside the vehicle interior; and
issuing a door unlock command if the transceiver is absent both inside the vehicle interior and outside the vehicle interior.

16. The method according to claim 15, further comprising:
emitting an audible signal via the audio device if the transceiver is absent both inside the vehicle interior and outside the vehicle interior.

17. The method according to claim 16, wherein the predetermined audible signal is emitted for a predetermined duration.

18. The method according to claim 17, wherein the predetermined audible signal is emitted unless the door is returned to the open position.

19. The method according to claim 15, further comprising:
displaying a predetermined message via the display device if the transceiver is absent both inside the vehicle interior and outside the vehicle interior.

20. The method according to claim 19, wherein the predetermined message is displayed for a predetermined duration.

* * * * *